March 7, 1961  R. E. SWARTS ET AL  2,973,651
ERECTION CUTOFF APPARATUS
Filed Jan. 6, 1960
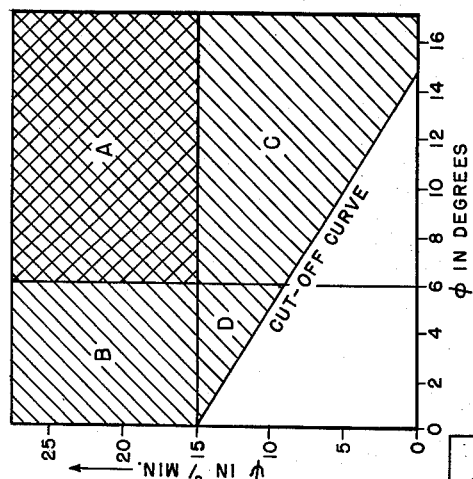
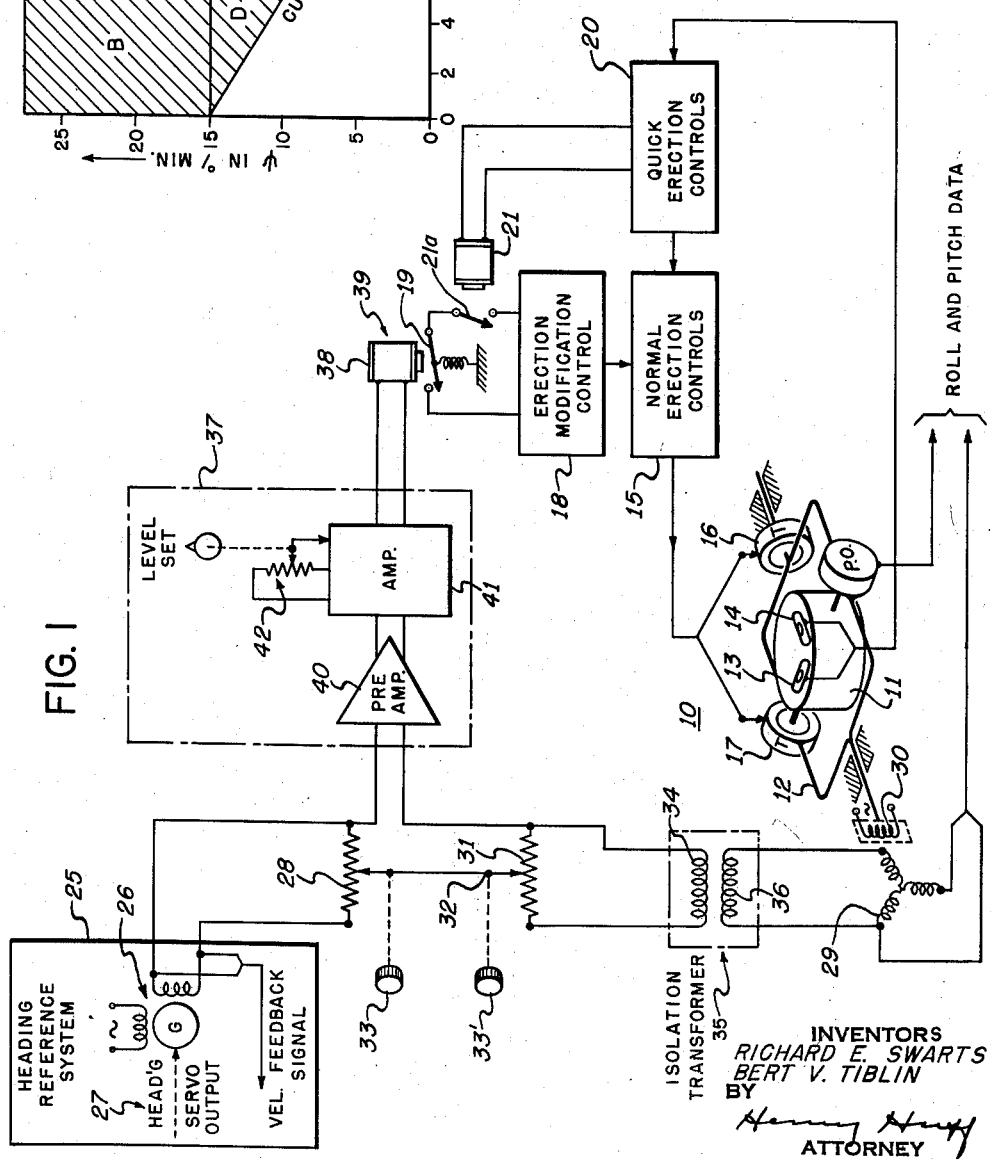
INVENTORS
RICHARD E. SWARTS
BERT V. TIBLIN
BY
ATTORNEY

United States Patent Office

2,973,651
Patented Mar. 7, 1961

2,973,651

ERECTION CUTOFF APPARATUS

Richard E. Swarts, Northport, and Bert V. Tiblin, Huntington, N.Y., assignors to Sperry Rand Corporation, Great Neck, N.Y., a corporation of Delaware Filed Jan. 6, 1960, Ser. No. 772

8 Claims. (Cl. 74—5.41)

The present invention relates to gyroscopic apparatus and, more particularly, to gyroscopic instruments for aircraft of the type which supply long term displacement references for the aircraft.

Displacement gyroscopes are usually slaved to earth-based references such as the earth's gravity field and/or the earth's magnetic field. For example, a gyroscope which is designed to define the vertical is usually slaved to a pendulous reference such as liquid levels or pendulums which detect tilt of the gyro from its true vertical position. Directional gyroscopes may be slaved to the horizontal component of the earth's magnetic field through a magnetic detector device such as a flux valve which may be maintained horizontally disposed by use of a pendulous mass. Therefore, when the aircraft turns or is subjected to lateral accelerations, the gravity or pendulous references will be caused to align themselves with the apparent vertical rather than the true vertical and, under such conditions, it is desired to remove, or at least modify, such slaving of the gyroscopes.

In the present specification, the present invention is embodied in a system wherein the erection of a vertical reference such as a vertical gyroscope is cut off or rendered ineffective or modified under flight conditions which result in excessive lateral accelerations, although it should be understood that the invention is not limited to such a device but also, or in addition, may be employed to cut off or otherwise modify the slaving of a directional gyro to the earth's magnetic field when lateral accelerations cause the flux valve to be tilted away from the horizontal. Furthermore, in the illustrated embodiment the directional and vertical gyroscopes are disclosed as separately mounted and independent instruments. However, it should also be understood that the invention may be readily applied to three axis stable platforms of the two or three gyro type when such platforms are normally placed under the control of long period gravity references.

Although it is well known that erection cutoff devices of various forms have heretofore been provided, many of these devices have not been completely satisfactory. Some have served to cut off erection only when the rate of turn of the craft exceeds some predetermined value while others have served to cut off erection only upon the bank angle of the craft exceeding a predetermined value. Others have been based on the actual direct or component measurement of lateral acceleration with or without bank angle.

If erection cutoff or erection modification, say of a vertical gyro, is based on a predetermined rate of turn only, say, for example, 15° per minute, large errors may accumulate during high speed turns below 15° per minute. In the very high speeds of present day aircraft, large errors may accumulate. For example, in an aircraft travelling at 1200 knots and turning at a rate of turn slightly less than 15° per minute, the vertical gyro can accumulate an error of as much as 10° during a continuous turning maneuver. Furthermore, it is not feasible to lower the rate of turn cutout point to some low value such as, for example, 3° per minute since, during low speed flight such as in and around landing or heavy traffic areas, constant turning at rates greater than 3° per minute will undoubtedly occur thereby cutting out the erection most of the time under these conditions. Therefore, using only rate of turn is not a satisfactory solution to the problem.

While an erection cutout system based on bank angle alone has the advantage that since a bank angle usually results in a turn rate and hence a lateral acceleration, it has the disadvantage that turn erection will not be cut out upon yawing only of the aircraft, which may in some installations be desirable. This is also true of lateral acceleration sensors. Furthermore, if a bank erection cutoff system only is used, no cutoff will be possible until the aircraft actually does make a bank of this magnitude and this may be undesirable because at high craft speeds a shallow bank angle may still produce a lateral acceleration of sufficient magnitude to adversely affect the gyroscopic reference. Also, in the bank-angle-only type of cutoff system, the cutoff angle cannot be set appreciably lower than 5° to 6° because if, for some reason, an angular error in the gyroscope exceeds this 5° or 6°, erection will be completely lost. For example, if a multi-engine aircraft had a failure of an engine or engines on one wing and the craft flown to maintain heading, a wing-down condition of more than 6° may occur. Under this abnormal condition, gyro erection would be cut off at a time when it is most needed. Furthermore, with such a system, the vertical gyro might cut itself off and eventually tumble under the following conditions:

(a) If the gyro were equipped with a fast erection system and the fast erection cycle were completed before the gyro were erected within 6° of the vertical;

(b) If the craft were on a ramp which is out of level by more than 6°;

(c) If, in taking off, a pitch error of more than 6° were accumulated, after which a 90° turn were made; the accumulated pitch error would be transferred to the roll axis.

In copending application Serial No. 848,398, filed October 23, 1959, in the name of Mitchel F. Wieser, entitled Erection Cutoff Apparatus, and assigned to the same assignee as the present invention, there is disclosed an erection cutoff or erection modifying system in which the erection cutoff or modification occurs only when the craft exceeds a predetermined rate of turn and a predetermined bank angle; i.e., only when both of these measures exceed some predetermined value. Referring briefly to Fig. 2 of the drawings, the erection modification system that copending application Serial No. 848,398 discloses is effective under the conditions represented by the area A; i.e., a rate of turn greater than 15° per minute and a 6° bank angle. However as can be seen, erection does remain on in areas B and C; that is, if the craft experiences a rate of turn greater than 15° per minute at a bank angle of less than 6°, or, if a bank angle greater than 6° occurs with less than a 15° per minute rate of turn, erection will likewise remain on.

There may be conditions where it is desired to cut off erection under flight conditons represented by areas B and C of Fig. 2. The erection cutoff or modification system of the present invention provides erection cutoff or modification not only in the areas A and B and most of area C, but also in area D. In other words, the system of the present invention greatly increases the effectiveness of the erection cutoff system over an extremely wide range of flight conditions. This is accomplished by measuring and providing signals in accordance with variations in the rate of turn and bank angle of the craft, summing these separate signals together, and then actuating an erection cutoff or modifying device, such as a relay, when said sum signal exceeds a predetermined value. The apparatus of the present invention also provides adjustments for varying the weight of each of the signals and the said predetermined value to fit any of a wide variety of aircraft types and flight conditions.

It is therefore a primary object of the present invention to provide an erection cutoff or erection modification system which combines the advantages of both a rate of turn cutoff system and a bank angle cutoff system while eliminating or minimizing the disadvantages of each.

It is another object of the present invention to provide an erection cutoff or modification system which is effective over a much greater range of aircraft types and flight conditions than any currently known cutoff devices.

In the following specification, the terms "erection cutoff" or "erection modification" are used in their broadest sense. That is, they denote not only the complete removal of one or more of the monitoring or long term gravity references from the control of the gyroscopic instrument, but also include any modification of such controls such as the transfer of the control of the roll erection torquer in a vertical gyro from the roll liquid level to the pitch liquid level as set forth in U.S. Patent 2,821,087, which patent is assigned to the same assignee as the present inevntion.

In most modern aircraft, some form of gyromagnetic compass is provided, and in most cases this compass system includes as a part thereof an instrument servo loop or follow-up loop which poitions the compass card or compass indicator. Also, such a follow-up loop will, in most cases, and in accordance with good servo practice, employ some means for determining its speed of operation such as, for example, a tachometer generator, the signal from which is used to stabilize the follow-up loop. In accordance with a feature of the present invention, it is this generator signal that is used as a measure of the rate of turn of the craft. By using this signal, no separate turn rate gyro or other separate turn rate sensitive device is necessary although the teachings of the present invention certainly do not preclude the use of such separate devices if desired.

Other objects, features and advantages of the present invention will become clearly apparent as a description of a preferred embodiment thereof proceeds, reference being made to the accompanying drawings wherein:

Fig. 1 is a schematic diagram of an erection modification system employing the teachings of the present invention; and Fig. 2 is a diagram which will aid in the understanding of the present inventive concepts.

Referring first to Fig. 2, it will be remembered that if a rate of turn cutoff system only is used and this is set to be effective at, say 15° per minute, erection of the gyroscopic instrument or instruments will be severed whenever the craft turn rate exceeds 15° per minute. In the diagram of Fig. 2, areas A and B indicate this range of rate of turn cutoff. On the other hand, if bank angle only is used to cut off erection and this bank angle is set at 6°, the range of erection cutoff is depicted by areas A and C (ignoring cutoff curve) of Fig. 2. In accordance with the teachings of the aforesaid Wieser application, both a predetermined rate of turn and a predetermined bank angle must occur before erection of the vertical gyro will be cut off or modified. Thus, the range of erection cutoff in that application is that depicted by the double cross-hatched area A. However, in accordance with the teachings of the present invention, wherein erection is modified in accordance with a predetermined value of the sum of a measure of the bank angle of the craft and a measure of the rate of turn of the craft, the range of erection cutoff will be extended into the areas B, C and D illustrated by the single cross-hatched areas. Thus, with the system of the present invention, erection will be cut off whenever any combination of rate of turn and bank angle exceeds some predetermined set value which is depicted in Fig. 2 as any area which lies above the cutoff curve. Thus, in the illustrative example depicted in Fig. 2, a rate of turn greater than 15° per minute with no bank angle will cut off erection, or a bank angle greater than 15° with no rate of turn will also cut off erection, and any combination of rate of turn and bank angle signals which add up to either of these values will likewise cut off the erection. It will be appreciated that, by varying the relative weights of the rate of turn measure and the bank angle measure in the system, a whole family of cutoff curves may be drawn. The amount of the variation of either bank angle or rate of turn depends upon the specific application; that is, on the speed range and purpose of the aircraft on which the equipment is to be employed. In the example illustrated in Fig. 2, the rate of turn and bank angle measures have equal weights.

Referring now to Fig. 1 of the drawings, the gyroscopic device of which erection controls are modified is illustrated as a simple vertical gyroscope 10. However, it will be understood, as stated above, that it may be any gyroscopic device such as a two or three gyro platform which is caused to maintain a long term vertical and directional reference through pendulous or gravity responsive devices. The gyroscope 10 comprises a rotor case 11 within which a rotor (not shown) is journalled and driven at high speed by suitable conventional drive means. The rotor case 11 is supported in the usual fashion in a roll gimbal 12 which, in turn, is journalled in the aircraft with its trunnion axis parallel to the craft's fore-and-aft axis. Mounted on the rotor case 11 are suitable pendulous reference devices such as liquid levels 13 and 14, one mounted so as to be sensitive to tilts of the rotor case about the craft's roll axis and the other responsive to tilts of the rotor case about the craft's pitch axis. Upon such tilt or drift of the rotor case, signals generated by the liquid levels are passed to conventional normal erection control circuits 15. The outputs of the normal erection control circuits 15 are applied to torque motors 16 and 17 on the roll and pitch axes, respectively, of the gyro 10 to apply torques about the proper axes to erect the gyro and thereby reduce to zero the tilt signals. The normal erection of a vertical gyroscope in accordance with tilt signals of liquid levels mounted thereon is so well known to those skilled in the art that specific details of the circuit arrangements are not deemed necessary. The normal erection controls 15 may be severed or otherwise modified by means of suitable erection cutoff or modification controls 18 which may merely be switches or other suitable devices which may serve, for example, to eliminate power from the gyro torquers or, for example, switch the roll torquer control from the roll pendulum to the pitch pendulum. Operation of the erection cutout controls 18 is instituted upon closure of relay actuated switch 19.

Most vertical gyroscopes for modern aircraft are provided with some form of quick erection controls depicted generally at 20 in Fig. 1. As is well known to those skilled in the art, these quick erection controls serve to bring the gyro to a vertical position in a matter of a few minutes rather than the much greater period of time which would be required if the normal erection controls of the gyro alone are employed. The quick erection control 20 is provided with a relay 21 which serves to keep the vertical gyro normal erection controls 15 on during the fast erection cycle so that the gyro can be brought to its vertical position upon starting without any danger of the erection cutout system of the present invention severing such quick erection controls. After the quick erection cycle is completed relay 21 is energized, thereby closing a switch 21a and rendering the switch 19 effective. A quick erection control and normal erection control apparatus suitable for use with the present invention is disclosed in U.S. Patent No. 2,879,672 in the name of P. J. Marino et al., which patent is assigned to the same assignee as the present invention.

As disclosed in the above-mentioned copending Wieser application, the rate of turn measure or signal is derived from a craft heading reference system. In the present application, this entire system is illustrated by the block 25 and it will be understood that the equipment therewithin corresponds to that heading reference system disclosed in the Wieser application. As in that application, the signal which varies in accordance with the turn rate of the aircraft is supplied by means of a rate generator 26 which is geared to the shaft 27 of the heading reference system indicator follow-up loop, the generator signal being primarily used as a servo velocity feedback signal. As described in the above Wieser application, the servo follow-up loop of the heading reference system 25 is relatively fast so that short term yawing of the craft is immediately followed by turning of the follow-up motor shaft 27 and hence the output of the generator 26 will be a voltage which varies in accordance with the speed of operation of the motor which is therefore a measure of the rate of change of heading or rate of turn of the craft. The output voltage of the generator 26 is applied across a potentiometer 28 so that any desired ratio of output voltage to rate of turn may be selected as by means of a manual adjustment 33.

The means for providing a signal which varies in accordance with the bank angle of the craft may comprise a conventional one phase three phase synchro generator, the three-phase stator 29 of which is fixed to the aircraft and the single-phase rotor 30 of which is rotated in accordance with bank angle by means of mechanical connection with the roll trunnion of the vertical gyro 10. The roll data supplied by the gyro 10 may be taken across two of the phases of the three-phase stator, which are at null when the gyro is vertical. The signal is applied through isolation transformer 35 to potentiometer 31, any desired ratio of roll output signal voltage to roll attitude being supplied by a wiper 32 by means of manual adjustment 33'.

In the illustrated embodiment of the instant invention, the rate of turn signal and the roll attitude signal are summed in the series summing network including potentiometer 28 and potentiometer 31, the summing circuit being connected as an input to any suitable amplifier 37. The output of amplifier 37, which is a signal which varies in accordance with the algebraic sum of the turn rate and bank angle signals is applied to the winding 38 of relay 39. This relay serves to close a normally open switch 19 which in turn energizes the erection modification controls 18 when the algebraic sum of the rate of turn and bank angle signals exceed some predetermined value.

The amplifier 37 may be of the type illustrated in detail in the above-mentioned Wieser application and comprises generally a preamplifier 40 and an output amplifier 41. The point at which the amplifier 41 provides an output may be adjusted by means of any suitable level adjustment, illustrated as a potentiometer 42 which may serve to bias the conduction of an amplifying element, such as a transistor in the output stage 41. Alternatively, or in addition, the relay 39 may be a sensitive relay which will not pull in until a predetermined voltage across its winding exists.

From hte foregoing description, the erection cutout or modification controls 18 will be rendered effective only upon the sum of the turn rate and bank angle signals exceeding some predetermined value and that this predetermined value may be adjusted as desired. Also, the relative weights of the rate of turn and bank angle signals controlling the erection modification controls may likewise be readily adjusted. Thus, the system may be readily adapted to satisfy any erection cutoff or modification requirements for any type of aircraft operating under any flight conditions.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. In a gyroscopic instrument for aircraft of the type that is normally slaved to a pendulous reference and having apparatus for modifying said slaving when said reference is subjected to acceleration forces acting thereon to adversely affect the vertical reference normally supplied thereby, the combination comprising means for providing a measure of the turn rate of the craft, means for providing a measure of the bank angle of the craft, means for combining said measures for supplying an output in accordance with the sum thereof, and means responsive to a predetermined value of said output for actuating said apparatus for modifying said slaving.

2. Apparatus as set forth in claim 1 wherein said turn rate measuring means includes a craft heading reference, and means controlled thereby for providing a measure of the rate change of craft heading.

3. Apparatus as set forth in claim 2 wherein said craft heading reference includes follow-up means responsive thereto, and speed generator means operated by said follow-up means for providing said measure of the rate of change of craft heading.

4. Apparatus as set forth in claim 1 wherein said bank angle measuring means includes a gyroscopic vertical reference device and pick-off means controlled thereby for providing said measure of craft bank angle.

5. Apparatus for modifying the long term slaving controls for gyroscopic instruments comprising means for providing a signal varying with rate turn of the craft on which said instrument is mounted, means for supplying a signal variable in accordance with the bank angle of said craft, means for combining said signals, and means responsive to a predetermined value of said combined signals for actuating said slaving modifying apparatus.

6. Apparatus for modifying the slaving controls of a gyroscopic reference system comprising means for providing a signal which varies in accordance with rate of turn of the aircraft, means for providing a signal which varies in accordance with the bank angle of said craft, means responsive to said signals for providing an output signal variable in accordance with the sum thereof, means responsive to a predetermined value of said output signal for actuating said slaving modifying control apparatus, and means for adjusting the relative magnitudes of said rate of turn and bank angle signals.

7. Apparatus as set forth in claim 6 wherein said last-mentioned means includes means for separately adjusting the magnitude of each of said signals.

8. Apparatus as set forth in claim 6 further including variable gain means for adjusting the magnitude of said output signal.

References Cited in the file of this patent

UNITED STATES PATENTS

| | | |
|---|---|---|
| 2,542,975 | Adkins | Feb. 27, 1951 |
| 2,608,099 | Roush | Aug. 26, 1952 |
| 2,763,157 | Summers | Sept. 18, 1956 |
| 2,879,672 | Marino et al. | Mar. 31, 1959 |